UNITED STATES PATENT OFFICE.

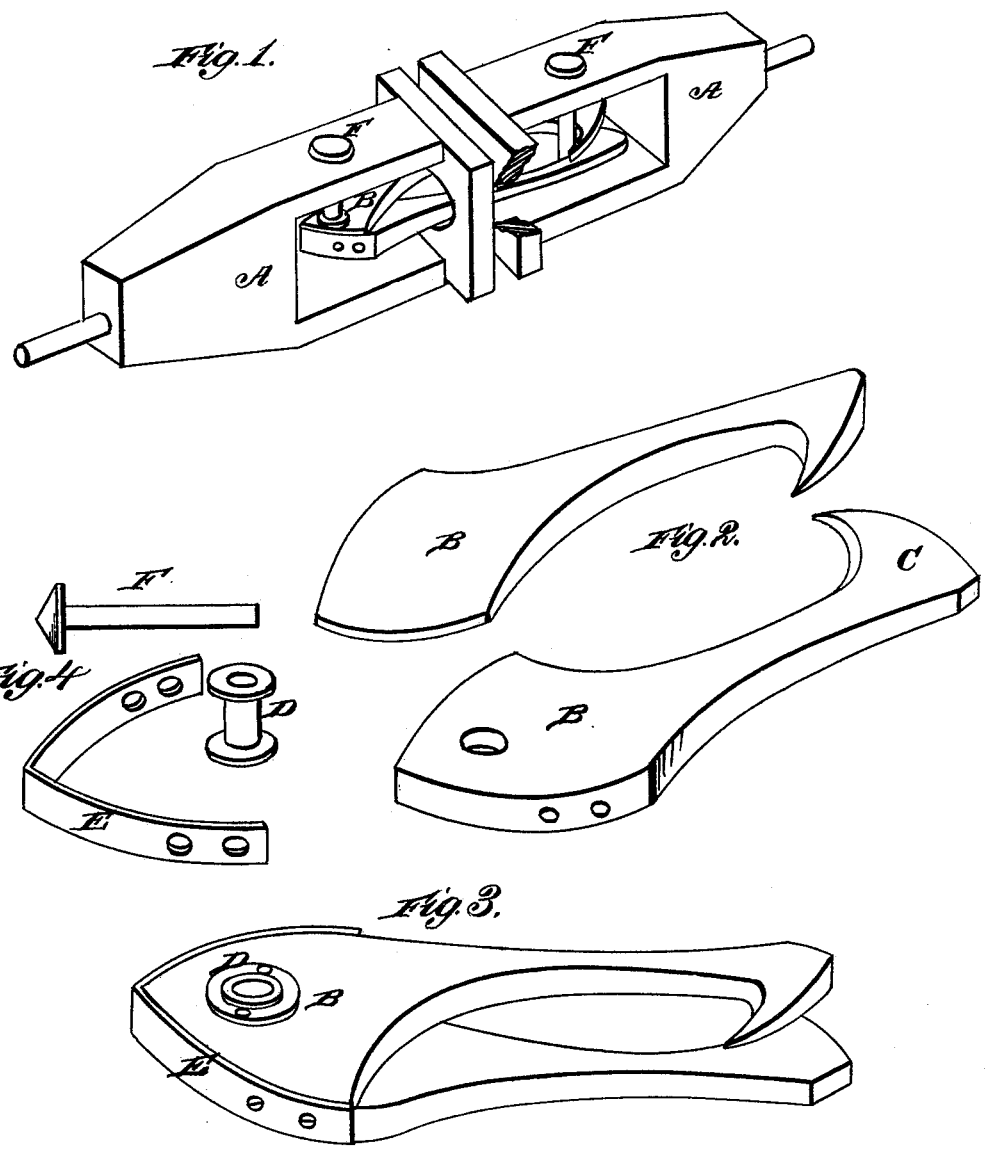

LEWIS A. SPEAR, OF FLINT, MICHIGAN, ASSIGNOR OF ONE-FOURTH HIS RIGHT TO JOHN ALGOE, OF SAME PLACE.

IMPROVEMENT IN CAR-COUPLINGS.

Specification forming part of Letters Patent No. 213,464, dated March 18, 1879; application filed December 16, 1878.

*To all whom it may concern:*

Be it known that I, LEWIS A. SPEAR, of the city of Flint, county of Genesee, and State of Michigan, have invented a new and useful Improvement in a Car-Coupler, of which the following is a specification:

The invention relates to an automatic link for the purpose of coupling railroad-cars.

The object of my invention is to provide a system of coupling railroad-cars which will be self-acting.

The invention consists in constructing a coupling-link with arrow-heads on its front end, with hooks on the inner part of each side. The sides, being constructed separately, are held together at the rear end by a hollow socket passing through each piece, with heads or nuts on each end of the socket. There is also a steel plate or spring passing around the rear end of the link and firmly bolted to each side piece.

In the accompanying drawing, in which similar letters of reference indicate like parts, letter A is a perspective of bumper-heads coupled with my invention, a portion of one bumper-head broken away. B B are the levers, which, put together, form the coupling-link. They are constructed exactly alike and are made flat.

C C are the hooks on the inner side of each lever B, which, when put together, overlap each other and form the arrow-heads. D is the hollow socket, which connects and holds together the two pieces or levers, B B, forming the coupling-link. E is the plate or spring, passing around the rear end of the coupling-link and screwed or bolted to each lever B. F is the coupling-pin as now used by railway companies.

The lower drawing (marked on its face B) is a perspective of the link put together and ready for use.

The operation of the device is as follows: The coupling-link is made sufficiently long to project far enough beyond the bumper-head to couple with the bumper-head of the opposite frame, which is done in this manner: the coupling-link is placed in the bumper-head, and the coupling-pin F is placed through the hollow socket D, which holds the link in such position that the arrow-heads C C will strike the coupling-pin in the bumper-head of the opposite frame, which will throw or spring apart the arrow-heads C C sufficiently far to allow them to pass beyond the coupling-pin, when the arrow-heads C C will spring back to their original position, and the operation of coupling is then complete.

It is obvious that the link may be readily moved and used in either bumper-head with the same advantage.

What I claim is—

In a car-coupling, the levers B B, connected by the socket D, in combination with the spring E, draw-head A, and pin F, substantially as and for the purpose set forth.

LEWIS A. SPEAR.

Witnesses:
IRA M. CAMP,
H. R. LOVELL.